Dec. 23, 1941.  W. J. LARSON  2,267,282
STROBOSCOPIC METER TESTING APPARATUS
Filed June 27, 1940
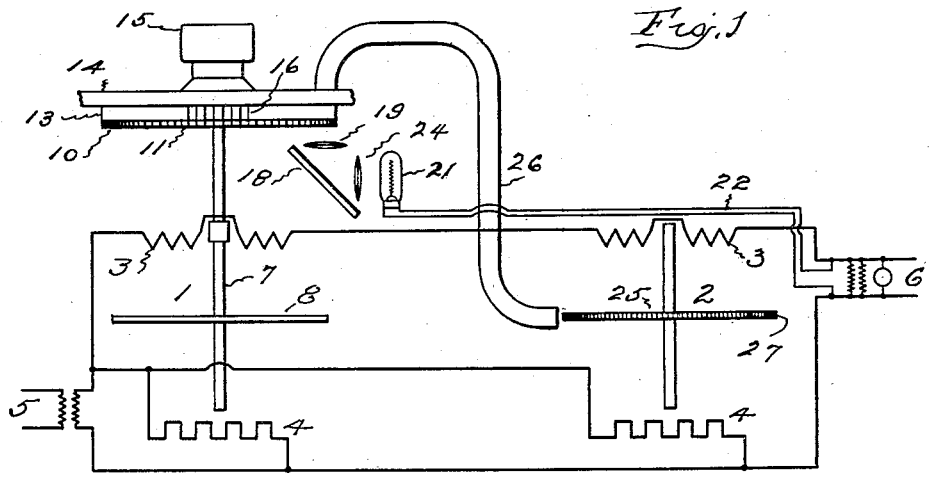
Fig. 1
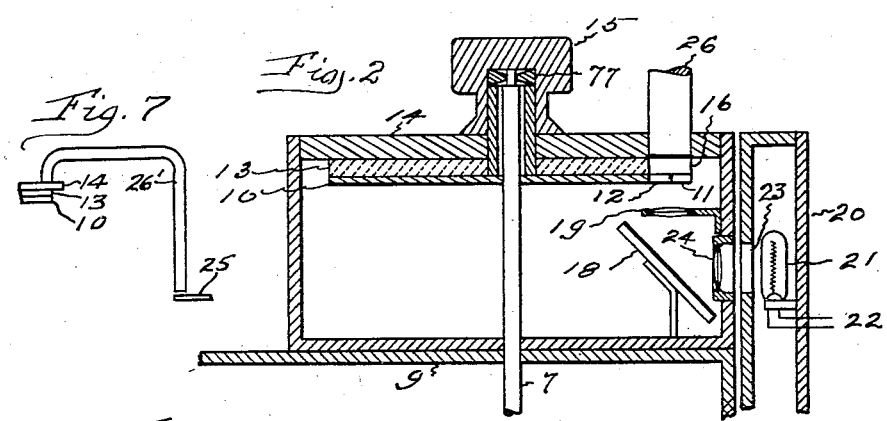
Fig. 7  Fig. 2
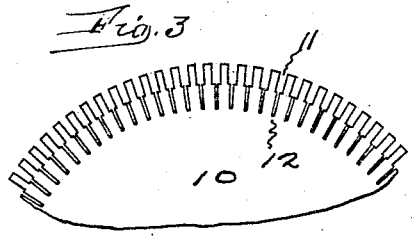
Fig. 3
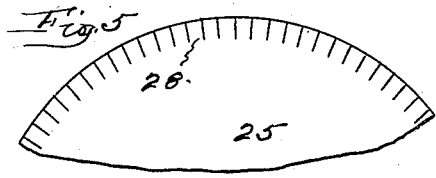
Fig. 5
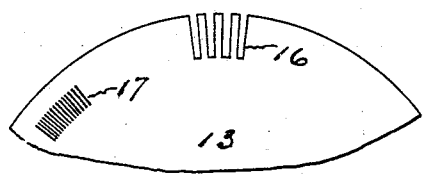
Fig. 4
Fig. 6
INVENTOR
Werner J. Larson, by
Harry P. Williams
atty.

Patented Dec. 23, 1941

2,267,282

UNITED STATES PATENT OFFICE 2,267,282

STROBOSCOPIC METER TESTING APPARATUS

Werner J. Larson, West Hartford, Conn., assignor to The States Company, Hartford, Conn., a corporation of Connecticut Application June 27, 1940, Serial No. 342,644

5 Claims. (Cl. 88—14)

This invention relates to apparatus which utilizes stroboscopic means for checking the accuracy of registration of electric service meters with relation to a master meter, and the object of the invention is to simplify and reduce the cost of stroboscopic means previously provided, without detraction of efficiency and convenience of use.

Fig. 1 of the accompanying drawing is a diagrammatic illustration of a service watt hour meter, a master meter, and the improved stroboscopic means actuated from the spindle of the master meter and adapted to throw light pulsations upon the disk of the service meter.

Fig. 2 shows on larger scale a section of the stroboscopic means which is applied to the master meter.

Fig. 3 shows a small segment on enlarged scale, of a disk which is fixed to the master meter spindle and rotates therewith.

Fig. 4 shows a small segment on enlarged scale of a stationary disk which is located closely adjacent to the disk that turns with the master meter spindle and which is adjustable with relation thereto for obtaining different effects.

Fig. 5 shows a top view on enlarged scale of a small segment of the service meter disk.

Fig. 6 shows an edge view of a small segment of the service meter disk.

Fig. 7 shows on reduced scale a modified shape of means for conducting light from the stroboscopic means to the service meter disk.

The master meter 1 and the service meter 2 are of a common type, and the current circuits 3 and potential circuits 4 are connected in the usual way between a source of current 5 and load 6 when the service meter is to be tested. In carrying out this invention the spindle 7 of the master meter disk 8 is extended, preferably upward through the top of the meter casing 9, and attached to the extension so as to rotate therewith and with the meter disk 8 is a stroboscopic disk 10.

The rotating stroboscopic disk is desirably stamped from thin metal with radial openings, preferably slots, entirely around the perimeter, the outer areas 11 of these slots being shown as approximately four times wider than the areas 12 of the slots which extend further inward toward the axis of the disk. There preferably are one hundred of these slots around the edges of this disk, although the invention is not limited to that number.

Closely adjacent to the top surface of the rotatable stroboscopic disk 10 is a complementary stroboscopic disk 13. The disk 13 is normally stationary, being supported in the top of a casing 14 and provided with a handle 15 by which it may be manually rotated for adjustment. The upper end of the extension of the spindle 7 may be supported by a suitable bearing 17 in the handle 15. One section of the edge of the stationary disk 13 is radially slotted, a group of four radial slots 16 which are of the same width and are spaced the same distance as the outer areas 11 of the slots in the rotating disk 10, being shown, although a fewer number of these slots would suffice. In a position radially inward and a short distance from the slots 16 of the stationary disk is a group of slots 17. These slots are preferably in width and spacing one-fourth of the width and spacing of the slots 16 in this disk, or they are the same width and one-fourth of the spacing of the areas 12 of the slots in the rotating disk 10, that is if the slots 12 and 16 are spaced apart one hundredth of the perimeter of the disk, as described, the slots 17 would be spaced apart one four hundredth of the perimeter of the disk. There may be other groups of slots in the stationary disk 13 and the spacing of the slots may be varied according to the conditions of the test to be met. The stationary disk 13 is desirably made of plastic, or material in which the sides of the slots will be non-light-reflecting, as dark "Bakelite." The disk 13 is preferably made in one piece of such thickness that the length of the slots, transversely of the disk, that is, the length in the direction of the passage of the light beam through the slots, will definitely collimate the light beam with the slots in the rotatable disk 10, in other words the length of the slots in the direction of the light beam is much greater than the width of the slots annularly so as to guide or determine the direction of the light beam and consolidate it in line with the slots in the disk 10.

Mounted in the casing 14 of the stroboscopic means is a mirror 18 positioned to reflect light upward toward the under side of the rotatable disk 10. A lens 19 is located between the mirror and the rotatable disk to concentrate on the slotted edge of that disk, light which is reflected upward by the mirror. In a casing 20 is a lamp 21, the circuit 22 of which is connected to any source of current which will cause the lamp to glow steadily. It is preferred that this lamp casing be disconnected from the stroboscopic casing to reduce the conduction of heat from the lamp to the stroboscopic elements and the master meter. An opening 23 is made in the wall of the lamp casing and opposite this opening is a lens 24 designed to focus light from the lamp onto the mirror.

Extending from over the slotted edges of the stroboscopic disks to the edge or top of the service meter disk 25 is a light conducting rod 26 made of material which conducts light longitudinally, such as "Lucite" or material having similar internal light reflecting characteristics. This rod may be arranged to conduct and throw light which it receives from the stroboscopic means either upon the edge of the service meter disk, as shown in Fig. 1, or upon the top of the service meter disk adjacent to the edge, as indicated in Fig. 7. The perimeter of the service meter disk is preferably graduated with four hundred equally spaced marks 27, and the upper surface near the edge of this disk may be graduated with one hundred marks 28. The invention is not limited to the exact number or location of markings on the service meter disk, for example, there might be one hundred on the edge and four hundred on the top, or markings of different spacings which are integral multiples of the spacings of the apertures of the stroboscopic disks.

The stroboscopic means may be applied to any suitable master meter by connecting its spindle with the meter spindle and mounting its casing upon the top of the meter casing with the lamp casing positioned adjacent thereto. The light conducting rod may be led to the edge or to the top of the service meter to be tested, as determined by the markings of the service meter disk and the slots in the stroboscopic disks to be used in a test. When the stroboscopic stationary disk 13 is turned to position the slots 16 beneath the receiving end of the light conducting rod 26, and the rotatable stroboscopic disk 10 is in motion the beam of light reflected from the lamp 21 will pass through the slots of the stroboscopic disks as they come into coincidence, and be cut off from the end of the light conducting rod as the slots pass out of coincidence, one hundred times during each revolution of the master meter disk, assuming the slots are spaced one hundredth of the perimeter of the disks, and consequently one hundred pulsations of light will be flashed through the light conducting rod onto the rim of the service meter disk 25. Under this condition, assuming the markings on the service meter disk which are illuminated are spaced one hundredth of the perimeter of the service meter disk, those markings would appear to be stationary if the service meter was in correct registration with the master meter. Should the service meter not be in correct registration, the markings would seem to move one way or the other depending upon whether the service meter was registering too high or too low.

If the stationary disk 13 of the stroboscopic means is turned so that the slots 17 are under the end of the light conducting rod 26 the outer wide areas 11 of the slots in the rotating disk 10 would be covered and light could only pass through the slot areas 12 of the disk 10 and the slots 17 of the disk 13 as those slots coincided during the rotation of the disk 10. Under this adjustment, assuming as above pointed out that the slots 12 were spaced one hundredth of the perimeter of the disk 10 and the slots of the disk 13 were spaced one four hundredth of the perimeter of the disk 13 there would be four hundred flashes of light thrown upon the receiving end of the light conductor rod 26 and transmitted to the disk 25 of the service meter. With this condition and the service meter disk markings spaced one four hundredth of the perimeter of the disk, those markings would, if the registration of the service meter was correct, appear to stand still. If the registration of the service meter was inaccurate, its markings would appear to run forward or backward.

The spacings of the slots in the stroboscopic disks may vary from the figures mentioned, and the spacings of the marks on the service meter disk may also vary from those given, but there should be a definite integral multiple co-relation between the spacings of the slots and markings to effect the result explained. The invention broadly resides in the provision of an adjustable stationary stroboscopic element with groups of slots of different spacings located in different radial positions, which may by a simple turn of that disk be brought between the rotating stroboscopic disk and the end of a light conducting rod to obtain the required number of light flashes on a service meter disk. Any correction of the service meter that is necessary may be made with this equipment in operation. The stroboscopic means has but few parts, it is easily adjusted for making different tests, and it may be made to be portable or can be built into a master meter.

The invention claimed is:

1. Stroboscopic meter testing apparatus comprising an opaque disk having equally spaced circumferentially positioned radially extending slots, adapted to be connected with and rotated from a master meter disk, a normally stationary opaque disk adjustably mounted coaxially with and close to and facing said rotatable disk, said adjustable disk having circumferentially spaced groups of radial slots located at different radial distances from the axis of the disk, the slots of the several groups being differently spaced and adapted to be brought into the path of light beams directed through portions of the slots in the rotatable disk, means for turning said adjustable disk and bringing a selected group of slots into the path of light beams passing through slots in the rotatable disk, means for directing a beam of light toward the slots in the rotatable disk and selected groups of slots in the adjustable disk, and means adapted to transmit flashes of light which pass through the selected slots of said disks to the rim of the disk of a meter to be tested.

2. Stroboscopic meter testing apparatus comprising an opaque disk having equally spaced circumferentially positioned radially extending slots of the same width and spaced slots of less width extending radially inward thereof, adapted to be connected with and rotated from a master meter disk, a normally stationary opaque disk adjustably mounted coaxially with and close to and facing said rotatable disk, said adjustable disk having circumferentially spaced groups of radial slots located at different radial distances from the axis of the disk the slots of the several groups being of different widths and adapted to be brought into alignment with the path of light beams directed through portions of the slots in the rotatable disk, means for turning said adjustable disk and bringing a selected group of slots into the path of light beams passing through slots in the rotatable disk, means for directing a beam of light toward the slots in the rotatable disk and selected group of slots in the adjustable disk, and means adapted to transmit flashes of light which pass through the selected slots of said disks to the rim of the disk of a meter to be tested.

3. Stroboscopic meter testing apparatus comprising an opaque disk having equally spaced circumferentially positioned radially extending slots each slot having an outer portion and an inner portion, the outer portion being wider than the inner portion, adapted to be connected with and rotated from a master meter disk, a normally stationary opaque disk adjustably mounted coaxially with and close to and facing said rotatable disk, said adjustable disk having groups of radial slots the slots of the several groups being of different widths and located at different radial distances from the axis of the disk and positioned to be brought into the path of light beams passing through slots in the rotatable disk, means for turning said adjustable disk and bringing the wider slots into the path of light beams passing through the wider portions of the slots in the rotatable disk, or the narrower slots into the path of light beams passing through the narrower portions of the slots in the rotatable disk, means for directing a beam of light toward the slots in the rotatable disk and selected group of slots in the adjustable disk, and means adapted to transmit flashes of light which pass through the selected slots of said disks to the rim of the disk of a meter to be tested.

4. Stroboscopic meter testing apparatus comprising an opaque disk having equally spaced circumferentially positioned radially extending slots, adapted to be connected with and rotated from a master meter disk, a normally stationary opaque disk adjustably mounted coaxially with and close to and facing said rotatable disk, said adjustable disk having circumferentially spaced groups of radial slots located at different radial distances from the axis of the disk, the slots of the several groups being differently spaced and adapted to be brought into the path of light beams directed through slots in the rotatable disk, means for turning said adjustable disk and bringing a selected group of slots into the path of light beams passing through slots in the rotatable disk, means for directing a beam of light toward the selected groups of slots of said disks, and a rod which has properties for internally longitudinally transmitting light, with an end supported over and closely adjacent to such slots in the disks as are selected and an end adapted to be positioned in close proximity to the perimeter of the rotatable disk of a meter to be tested.

5. Stroboscopic meter testing apparatus comprising a casing, two complementary opaque disks supported coaxially face to face within the casing, one of said disks being capable of rotation and having means whereby it may be connected with the spindle of a master meter disk and the other of said disks being capable of angular adjustment with relation to said rotary disk, said rotary disk having equally spaced annularly positioned radially extending slots, said adjustable disk having groups of radial slots the slots of the several groups being differently spaced and located at different radial distances from the axis of the disk and positioned to be brought into the path of light beams passing through slots in the rotatable disk, means for turning said adjustable disk and bringing a selected group of slots into the path of light beams passing through slots in the rotatable disk, means within the casing for directing light toward the selected slots of said disks, and a light transmitting rod with an end supported by the casing and exposed to light beams passing through the selected slots of the disks and an end adapted to be positioned adjacent to the rim of the disk of a meter to be tested.

WERNER J. LARSON.